United States Patent
Burström et al.

(10) Patent No.: US 10,171,218 B2
(45) Date of Patent: Jan. 1, 2019

(54) METHOD FOR ESTIMATING SIGNAL QUALITY OF TRANSMISSION TO A USER EQUIPMENT FROM A TRANSMISSION POINT

(71) Applicant: Telefonaktiebolaget LM Ericsson (publ), Stockholm (SE)

(72) Inventors: Per Burström, Luleå (SE); Sara Sandberg, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 15/300,910

(22) PCT Filed: Apr. 3, 2014

(86) PCT No.: PCT/SE2014/050401
§ 371 (c)(1),
(2) Date: Sep. 30, 2016

(87) PCT Pub. No.: WO2015/152778
PCT Pub. Date: Oct. 8, 2015

(65) Prior Publication Data
US 2017/0026158 A1  Jan. 26, 2017

(51) Int. Cl.
*H04L 5/00* (2006.01)
*H04B 7/024* (2017.01)
(Continued)

(52) U.S. Cl.
CPC ........... *H04L 5/0053* (2013.01); *H04B 7/024* (2013.01); *H04B 7/0626* (2013.01); *H04W 72/082* (2013.01); *H04L 5/0048* (2013.01)

(58) Field of Classification Search
CPC .. H04L 5/0053; H04L 5/0048; H04W 72/082; H04B 7/0626; H04B 7/024
See application file for complete search history.

(56) References Cited

U.S. PATENT DOCUMENTS 9,119,082 B1 * 8/2015 Gomadam, Sr. ......... H04B 1/28
9,148,818 B2 * 9/2015 Yue ......................... H04L 5/001
(Continued)

FOREIGN PATENT DOCUMENTS

EP    2662987 A2   11/2013
WO   2013141781 A1   9/2013
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.4.0, Sep. 2013, 1-182.

*Primary Examiner* — Tejis Daya
(74) *Attorney, Agent, or Firm* — Sage Patent Group

(57) ABSTRACT

A method performed by a network node (110) for enabling transmissions to a user equipment, UE (121), from transmission points, TPs, in a coordination cell area (101-105, 07) in a radio communications network (100) is provided. The network node (110) configures two or more TPs in the coordination cell area (101-105, 107) not currently serving the UE (121) to transmit signals on interference measurement, IM, resources of two or more Channel State Information, CSI, processes of the UE (121) according to three or more different interference states. The network node (110) then receives, from the UE (121), CSI reports based on the transmitted signals on the IM resources of the two or more CSI processes of the UE (121). After receiving the CSI reports, the network node (110) estimates one signal quality value for each of the three or more different interference states of the transmitted signals and at least one further signal quality value corresponding to at least one interference state that is not part of the three or more different interference states of the transmitted signals based on the received CSI reports of the two or more CSI processes. A (Continued)

network node (110) for enabling transmissions to a UE (121) from TPs in a coordination cell area (101-105, 107), a computer program and a carrier are also provided.

18 Claims, 5 Drawing Sheets

(51) Int. Cl.
*H04B 7/06* (2006.01)
*H04W 72/08* (2009.01)

(56) References Cited

U.S. PATENT DOCUMENTS

| | | | |
|---|---|---|---|
| 9,496,997 B2 * | 11/2016 | Park | H04B 7/024 |
| 9,775,124 B2 * | 9/2017 | Yi | H04W 56/001 |
| 9,781,638 B2 * | 10/2017 | Davydov | H04W 4/70 |
| 9,806,866 B2 * | 10/2017 | Hoshino | H04L 5/0053 |
| 2012/0287799 A1 | 11/2012 | Chen et al. | |
| 2013/0003788 A1 | 1/2013 | Marinier et al. | |
| 2013/0114428 A1 | 5/2013 | Koivisto et al. | |
| 2013/0155973 A1 | 6/2013 | Geirhofer et al. | |
| 2013/0156001 A1 | 6/2013 | Gomadam et al. | |
| 2013/0322376 A1 | 12/2013 | Marinier et al. | |

FOREIGN PATENT DOCUMENTS

| | | | |
|---|---|---|---|
| WO | 2014058372 A1 | 4/2014 | |
| WO | 2015152777 A1 | 10/2015 | |

* cited by examiner

| CSI-IM | TP1 | TP2 | TP3 |
|---|---|---|---|
| 1 | 0 | $X_2$ | $X_3$ |
| 2 | 0 | $\sim X_2$ | $X_3$ |
| 3 | 0 | $X_2$ | $\sim X_3$ |
| 4 | 0 | $\sim X_2$ | $\sim X_3$ |

Measured for X: rows 1–3; Calculated for X: row 4

Fig. 3

| Ref.no | CSI-IM | TP1 | TP2 | TP3 | TP4 | TP5 | Others |
|---|---|---|---|---|---|---|---|
| 1 | 1 | 0 | $X_2$ | $X_3$ | $X_4$ | $X_5$ | ICIx |
| 2 | 2 | 0 | $\sim X_2$ | $X_3$ | $X_4$ | $X_5$ | ICIx |
| 3 | 3 | 0 | $X_2$ | $\sim X_3$ | $X_4$ | $X_5$ | ICIx |
| 4 | - | 0 | $\sim X_2$ | $\sim X_3$ | $X_4$ | $X_5$ | ICIx |
| 5 | 1 | 0 | $Y_2$ | $Y_3$ | $Y_4$ | $Y_5$ | ICIy |
| 6 | 2 | 0 | $Y_2$ | $Y_3$ | $\sim Y_4$ | $Y_5$ | ICIy |
| 7 | 3 | 0 | $Y_2$ | $Y_3$ | $Y_4$ | $\sim Y_5$ | ICIy |
| 8 | - | 0 | $Y_2$ | $Y_3$ | $\sim Y_4$ | $\sim Y_5$ | ICIy |

Measured for Y: rows 5–7; Calculated for Y: row 8

Fig. 4

| Ref.no | CSI-IM | TP1 | TP2 | TP3 | TP4 | TP5 | Others | |
|---|---|---|---|---|---|---|---|---|
| 1 | 1 | 0 | $X_2$ | $X_3$ | $X_4$ | $X_5$ | ICIx | |
| 2 | 2 | 0 | $\sim X_2$ | $X_3$ | $X_4$ | $X_5$ | ICIx | |
| 3 | 3 | 0 | $X_2$ | $\sim X_3$ | $X_4$ | $X_5$ | ICIx | |
| 4 | - | 0 | $\sim X_2$ | $\sim X_3$ | $X_4$ | $X_5$ | ICIx | |
| 5 | 1 | 0 | $Y_2$ | $Y_3$ | $Y_4$ | $Y_5$ | ICIy | |
| 6 | 2 | 0 | $Y_2$ | $Y_3$ | $\sim Y_4$ | $Y_5$ | ICIy | |
| 7 | 3 | 0 | $Y_2$ | $Y_3$ | $Y_4$ | $\sim Y_5$ | ICIy | |
| 8 | - | 0 | $Y_2$ | $Y_3$ | $\sim Y_4$ | $\sim Y_5$ | ICIy | |
| 9 | - | 0 | $\sim Y_2$ | $Y_3$ | $Y_4$ | $Y_5$ | ICIy | |
| 10 | - | 0 | $\sim Y_2$ | $Y_3$ | $\sim Y_4$ | $Y_5$ | ICIy | |
| ... | ... | ... | ... | ... | ... | ... | ... | |

Measured X: rows 1–3
Calculated from X: row 4
Measured Y: rows 5–7
Calculated from Y: row 8
Calculated from X & Y: rows 9–10

Fig. 5

METHOD FOR ESTIMATING SIGNAL QUALITY OF TRANSMISSION TO A USER EQUIPMENT FROM A TRANSMISSION POINT

TECHNICAL FIELD

Embodiments herein relate to estimating signal quality of transmission to a user equipment in a radio communications network. In particular, embodiments herein relate to a network node and a method therein for estimating signal quality of transmissions to a user equipment from a transmission point of the cell serving the user equipment in a radio communications network.

BACKGROUND

In a typical radio communications network, wireless terminals, also known as mobile stations, terminals and/or user equipments, UEs, communicate via a Radio Access Network, RAN, to one or more core networks. The radio access network covers a geographical area which is divided into cell areas, with each cell area being served by a base station, e.g. a radio base station, RBS, or network node, which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially "flat" architecture comprising radio base station nodes without reporting to RNCs.

In LTE, as in any communication system, a UE may estimate the effective channel that a reference signal is traversing by measuring on the reference signal, e.g. a Channel State Information Resource Symbol, CSI-RS, defined for LTE. Here, the effective channel comprises the radio propagation channel, antenna gains, and any possible antenna virtualizations. For antenna virtualization, a CSI-RS port may be precoded so that it is virtualized over multiple physical antenna ports, that is, the CSI-RS port may be transmitted on multiple physical antenna ports, possibly with different gains and phases.

By further configuring radio resources which a UE is mandated to use for measuring interference plus noise, such as, for example, CSI-Interference Management, CSI-IM, resources defined for LTE, a UE may assume that there are a number of transmission points that are transmitting on this radio resource, and that the received signal power may therefore be used as a measurement of the interference plus noise from these transmission points. Thus, based on a specified reference signal measurement and on an interference measurement configuration, the UE may estimate the effective channel and interference plus noise, and consequently also determine which rank, pre-coder and transport format to recommend which best matches the particular channel.

The CSI resource feedback from the UE to the network node may be either explicit or implicit. LTE has currently adopted an implicit CSI mechanism in which a UE does not explicitly report, e.g. the complex valued elements of a measured effective channel, but rather that the UE recommends a transmission configuration suitable for the measured effective channel. The recommended transmission configuration thus implicitly gives the network node information about the underlying channel state.

In LTE, the CSI feedback is given in terms of a transmission Rank Indicator, RI, a Pre-coder Matrix Indicator, PMI, and Channel Quality Indicator(s), CQI. The CQI/RI/PMI report, i.e. the CSI report, may be wideband or frequency selective depending on which reporting mode that is configured. Typically, the UE performs filter processing of the measured reference signals as a means to improve receiver performance by the UE. This filter processing may be performed in time and frequency, and in some cases, such as for De-Modulation Reference Signals, DMRS, the UE is mandated to perform the filter processing according to standard specifications.

However, for CSI feedback reports, there is no mandated filter processing of the interference measurements performed on CSI-IM. Thus, the filter processing of the interference measurements performed on CSI-IM by the UE is a UE receiver design choice that is proprietary for each UE vendor. Typically, a UE performs time filter processing of the measured interference on CSI-IM, and use the time filtered value when calculating the CQI, RI and PMI to include in the CSI reports.

It may be noted that the RI corresponds to a recommended number of streams that are to be spatially multiplexed and thus transmitted in parallel over the effective channel, whereas the PMI identifies a recommended pre-coder, normally present in a codebook, for the transmission, which relates to the spatial characteristics of the effective channel.

The CQI represents a recommended Modulation and Coding Scheme, MCS. For example, a UE may normally report one of 16 different CQI values representing 16 different MCS. The UE reports the highest CQI value that has target block error rate less than 10%. Thus, since the current Signal-to-Interference-plus-Noise Ratio, SINR, of the spatial stream(s) over which the transmission occurs directly effects the target block error rate, there is thus a relationship between the CQI and the SINR of the spatial stream(s) over which the transmission occurs.

In uncoordinated systems, i.e. wherein each transmission point or cell independently performs transmissions to the UEs located within its range, the UE may effectively measure the interference observed from all other transmission points, or all other cells, using wideband interference information, such as, for example, Reference Signal Received Power (RSRP). This may then serve as the relevant interference level in an upcoming data transmission.

In coordinated systems, i.e. wherein multiple transmission points or cells may schedule and perform coordinated transmissions to the UEs located within their ranges, the network may to a large extent control the transmission points or cells that are interfering with transmissions to a UE. Hence, there will here be multiple interference hypotheses/scenarios which will depend on which transmissions points or cells that are transmitting data to other UEs.

Additionally, the network may here also choose to transmit interference from specific transmission points or cells for the purpose of testing how that particular interference hypothesis/scenario effects transmissions to a UE.

In 3GPP LTE Release 11, CSI processes are defined such that each CSI process is associated with a CSI-RS resource and a CSI-IM resource (see e.g. 3GPP TS 36.213 V11.4.0, 2013-09, Sections 7.2.5-7.2.6). A UE configured for Transmission Mode 10, TM10, in LTE Release 11 may be configured with one or more CSI processes per serving cell by higher layers, and a CSI report reported by the UE corresponds to a CSI process. Since multiple, e.g. up to three or perhaps even six, CSI processes may be reported by the UEs, the network may test different interference hypotheses or scenarios simultaneously for a UE. Then, based on their different effects which are reported back to the network node by the UE in the CSI reports, the network node may adapt its transmission scheme to the UE for future transmissions.

For large coordination clusters in challenging scenarios with many strong interferers, the network may require CSI information corresponding to many different interference hypotheses/scenarios. Depending on the coordination scheme, the number of interference hypotheses/scenarios to test may be as many as $2^N$ for N number of interferers. A known way to assess multiple interference hypotheses/scenarios is to use time-multiplexing, i.e. change the interference hypotheses/scenarios in time and store the results. This, however, may be a time-consuming task and result in that the interference measurement may not be performed on a fast enough basis for coordinated transmissions.

SUMMARY

It is an object of embodiments herein to improve the efficiency of interference measurements in a radio communications network.

According to a first aspect of embodiments herein, the object is achieved by a method performed by a network node for enabling transmissions to a user equipment, UE, from transmission points, TPs, in a coordination cell area in a radio communications network is provided. The network node configures two or more TPs in the coordination cell area not currently serving the UE to transmit signals on interference measurement, IM, resources of two or more Channel State Information, CSI, processes of the UE according to three or more different interference states. The network node then receives, from the UE, CSI reports based on the transmitted signals on the IM resources of the two or more CSI processes of the UE. After receiving the CSI reports, the network node estimates one signal quality value for each of the three or more different interference states of the transmitted signals and at least one further signal quality value corresponding to at least one interference state that is not part of the three or more different interference states of the transmitted signals based on the received CSI reports of the two or more CSI processes.

According to a second aspect of embodiments herein, the object is achieved by a network node for enabling transmissions to a UE from TPs in a coordination cell area in a radio communications network. The network node is configured to configure two or more TPs in the coordination cell area not currently serving the UE to transmit signals on IM resources of two or more CSI processes of the UE according to three or more different interference states. The network node is also configured to receive, from the UE, CSI reports based on the transmitted signals on the IM resources of the two or more CSI processes of the UE. Furthermore, the network node is configured to estimate one signal quality value for each of the three or more different interference states of the transmitted signals and at least one further signal quality value corresponding to at least one interference state that is not part of the three or more different interference states of the transmitted signals based on the received CSI reports of the two or more CSI processes.

According to a third aspect of embodiments herein, the object is achieved by a computer program, comprising instructions which, when executed on at least one processor, cause the at least one processor to carry out the method described above.

According to a fourth aspect of embodiments herein, the object is achieved by a carrier containing the computer program described above, wherein the carrier is one of an electronic signal, optical signal, radio signal, or computer readable storage medium.

By making use of the capability of a UE to simultaneously measure several different interference scenarios from several TPs on the interference measurement resources of several CSI processes, the network node is able to separately identify and estimate interference contributions from the UE's most interfering TPs by configuring different interference patterns to be transmitted to the UE from the several TPs and estimating further interference patterns by calculation. The estimated interference contributions may be used by the network node for scheduling purposes, and/or to select transmission configurations for different transmission patterns. Thus, instead of relying on interference contributions estimated based on less accurate wideband interference information, such as, e.g. RSRP, these estimated interference contributions will be more accurate since they will capture fast fading, rank selection, interference suppression and also take inter-cluster interference, ICI, into account.

Consequently, by providing more accurate interference contribution estimations, the efficiency of interference measurements in the radio communications network will be improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 3 is a schematic table depicting embodiments of a network node.

FIG. 4 is another schematic table depicting embodiments of a network node.

FIG. 5 is a further schematic table depicting embodiments of a network node.

DETAILED DESCRIPTION

Figure 1:
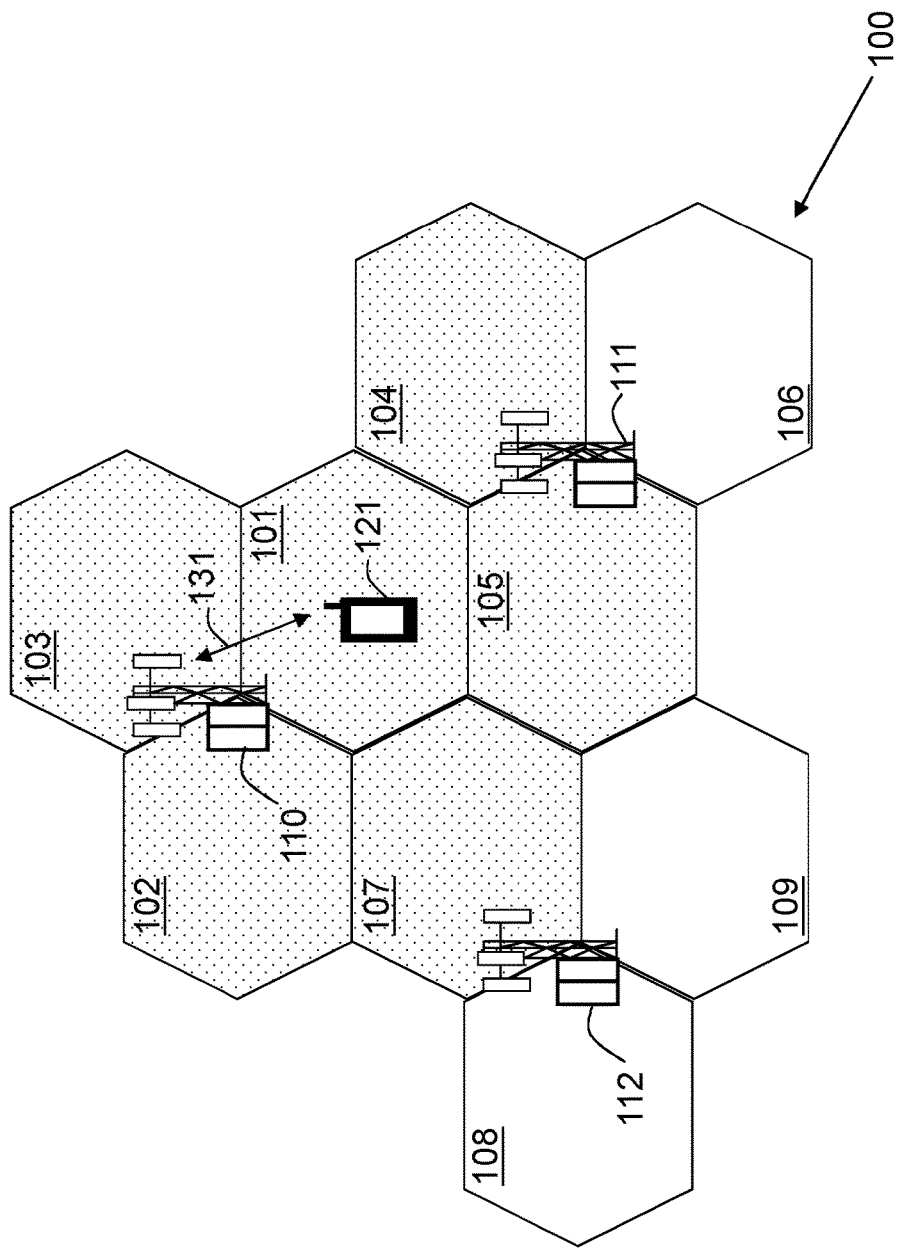
FIG. 1 is a schematic block diagram illustrating embodiments of network nodes in a radio communications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 shows an example of a radio communications network 100 in which embodiments herein may be implemented. Although illustrated in FIG. 1 as an LTE network, the radio communications network 100 may be any wireless communication system, such as, LTE-Advanced, Wideband Code Division Multiple Access (VVCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other 3GPP cellular network or system. The radio communications system 100 comprises the network nodes 110-112.

Each of the network nodes 110-112 may e.g. be an eNB, eNodeB, or a Home Node B, a Home eNode B, femto Base Station (BS), pico BS or any other network unit capable to serve a user equipment or a machine type communication device in the radio communications system 100. The network nodes 110-112 may also be e.g. a base station controller, a network controller, a relay node, a repeater, an access point, a radio access point, a Remote Radio Unit (RRU) or a Remote Radio Head (RRH). Furthermore, the network nodes 110-112 each comprise one or more antennas for wireless radio communication with user equipments, UEs, located within their coverage range; that is, each of the network nodes 110-112 may use one or more of its antennas to provide radio coverage within its cells. The network nodes 110-112, or one or more of its antennas, may be referred to herein as a transmission point, TP.

A cell may be seen as a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying each cell uniquely in the whole radio communication network 100 may also broadcasted in the cell. The network node 110 communicates over the air or radio interface operating on radio frequencies with the UEs within range of the network node 110.

A user equipment 121 is located within the cell 101. The UE 121 is configured to communicate within the radio communications network 100 via the network node 110 over a radio link 131 when present in the cell 101 served by the network node 110. The UE 121 may e.g. be any kind of wireless device such as a mobile phone, a cellular phone, a Personal Digital Assistant (PDA), a smart phone, a tablet, a sensor equipped with a UE, Laptop Mounted Equipment (LME) (e.g. USB), Laptop Embedded Equipment (LEE), Machine Type Communication (MTC) device, a UE with D2D capability, Customer Premises Equipment (CPE), etc. The UE 121 may also refer to a Machine-to-Machine, M2M, communication device that serves as a data communication modem or is built into equipment communicating data with a server without human interaction.

In the example shown in FIG. 1, the network nodes 110-112 are each configured to provide wireless radio coverage to UEs in each of its cells 101-103, 104-106, 107-109, respectively. The network nodes 110-112 may be connected and configured to communicate with each other, e.g. by signalling over an X2 connection. The network nodes 110-112 may also be configured to provide coordinated transmissions to UEs, e.g. the UE 121 in cell 101, located within a specific coordinated area, e.g. cells 101-105 and cell 107 in FIG. 1 (as shown by the dotted area). This means that one or more TPs of each of the network nodes 110-112 may provide coordinated transmissions to and/or serve the UE 121. The network nodes 110-112 corresponding to this coordination cell area may be referred to as a Coordinated Multi Point, CoMP, cluster. The coordination cell area may comprise any number of coordinated cells or sectors of the network nodes 110-112. Coordinated transmissions to UEs may be performed by the network nodes 110-112 to increase the spectral efficiency in the radio communications network and thus increase the system throughput.

Also, in some cases, such as, for example, for UEs that are on the boundaries of the coordination cell area, the dominant interferer TPs may not be found within the coordinated cell area, i.e. in range of the coordinated TPs or cells, but from outside the coordinated cell area. This Inter-Cluster Interference, ICI, which cannot be controlled from within the coordinated cell area, may also impact the CSI reports in an unknown way.

Furthermore, although embodiments below are described with reference to the scenario of FIG. 1, this scenario should not be construed as limiting to the embodiments herein, but merely as an example made for illustrative purposes.

As part of developing the embodiments herein, it has been noticed that there is a problem when selecting and prioritizing among the interference hypotheses/scenario. When using time-multiplexing to assess multiple interference hypotheses/scenarios, a non-prioritized measuring of the different interference hypotheses/scenarios will, particularly when the number of important interfering TPs is large, most likely mean that the UE's measurements are outdated long before the same hypothesis is measured again. Hence, a classification system is required for this task. Normally, the strength of each interfering TP for each UE may be assessed based on wideband interference information, such as, e.g. Reference Signal Received Power, RSRP. However, whether or not an interfering TP is really relevant depends more on the probabilities of different transmission patterns, i.e. different interference hypotheses/scenarios, which usually require consideration of the UE traffic situation in the cells for the upcoming measurement period.

A further problem with using time-multiplexing to assess multiple interference hypotheses/scenarios is coordinating and timing the interference transmissions for multiple UEs. Each UE will have a specific order of importance of the interfering TPs, and since the interference measurement resources, i.e. CSI-IM, used by the UEs normally needs to be shared, the interference hypotheses/scenarios will in many cases be mutual to two or more UEs. However, it should be noted that an alternative to time-multiplexing is to neglect assessing CSI report information for many different interference hypotheses/scenarios. If no CSI report information is available for a specific interference hypotheses/scenario, then wideband interference information may be used to estimate the interference for the actual interference hypothesis/scenario. However, wideband interference information is less accurate than CSI report information based on UE measurements, since it does not capture the fast fading and frequency selectivity of the interference.

In accordance with embodiments described herein, these issues are addressed by the network node 110 in that it systematically evaluates the interfering TPs that affect transmissions to a UE 121. The network node 110 improves the determining of a SINR for a given transmission interference hypothesis/scenario by replacing wideband interference information with CSI information based on UE measurements of the actual interference. This may then be used by the network node 110 in order to improve the performance of, for example, coordinated transmissions to the UEs in the radio communications network 100.

In other words, by making use of the capability of a UE 121 to simultaneously measure several different interference hypotheses/scenarios from several TPs on the CSI-IM resources of several CSI processes, the network node 110 is able to separately identify and estimate the interference contribution from at least one of the UE's 121 most interfering TPs. This is performed by configuring different interference hypotheses/scenarios to be transmitted to the UE 121 on the CSI-IM resources of different CSI processes. The estimated interference contributions may be used by the network node 110 for scheduling purposes, such as, e.g. coordinated scheduling and transmissions, and to select transmission configurations for different transmission hypotheses/scenarios, e.g. Modulation and Coding Schemes, MCS, rank, RI, etc. Thus, instead of relying on interference contributions estimated on less accurate wideband interference information, such as, e.g. RSRP, these estimated interference contributions will be more accurate since they will capture fast fading, rank selection, interference suppression and Inter-Cluster Interference, ICI. Consequently, by providing more accurate interference contribution estimations, the efficiency of interference measurements in the radio communications network will be improved.

It should be noted that the period of time during which one interference hypotheses/scenario may be measured to be able to achieve convergence of the filtering processing in the UE 121 is denoted as a measurement period. An important aspect for the performance of the coordinated transmissions from the network node 110 is to be able to collect interference information quickly, i.e. having as short measurement periods as possible. The measurement period may comprise multiple CSI reporting periods, wherein a CSI reporting period is the time between the receptions of CSI reports at the network node 110.

Example of embodiments of a method performed by a network node 110 for enabling transmissions to a UE 121 from TPs in a coordination cell area 101-105, 107 in a radio communications network 100, will now be described with reference to the flowchart depicted in FIG. 2.

Figure 2:
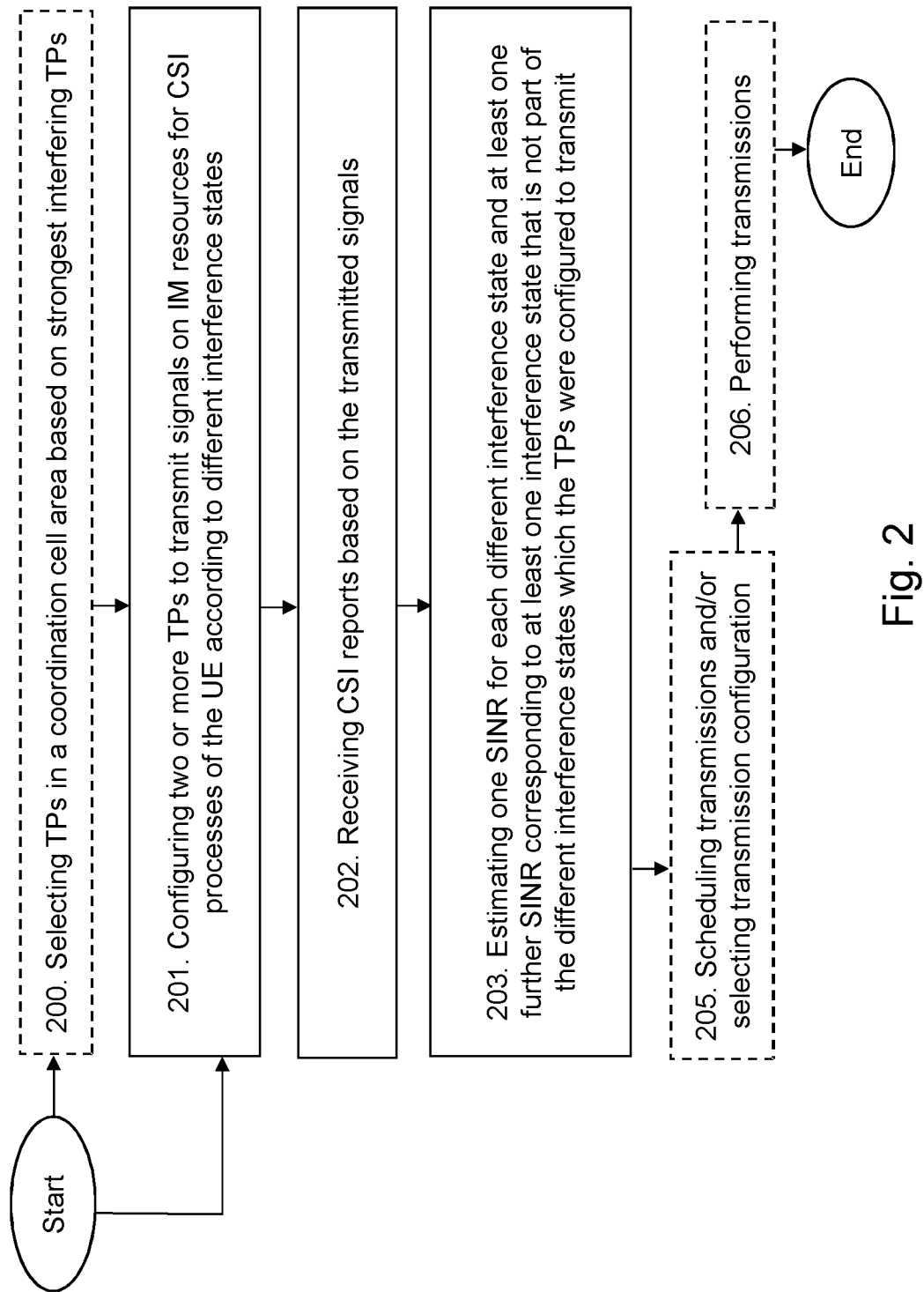
FIG. 2 is a flowchart depicting embodiments of a method in a network node.

FIG. 2 is an illustrated example of actions or operations which may be taken by any one of the network nodes 110-112. However, it should also be noted that these actions or operations may also be performed by a centralized network node in the radio communications network 100, such as, e.g. a core network node, a radio network controller, a Radio Resource Management, RRM, server, an Operations Support System, OSS, node or the like. The centralized network node may also be e.g. an eNB controlling distributed Remote Radio Units, RRUs, via e.g. a Common Public Radio Interface, CPRI, or an eNB controlling radio heads over an active Distributed Antenna System, DAS, network. The method may comprise the following actions.

Action 200

In this optional action, the network node 110 may start by selecting TPs in a coordination cell area based on strongest interfering TPs. This means that the network node 110 may select two or more TPs in the coordination cell area 101-105, 107 not currently serving the UE 121 based on the strongest interfering TPs to transmissions to the UE 121 from TPs in the coordination cell area 101-105, 107 currently serving the UE 121. Optionally, and as will be described more in detail below, this further means that the network node 110 may select a first, second, third and/or fourth TP switching transmission state in the second, third/fourth, sixth and seventh interference state, respectively, in an order based on the strongest interfering TP to transmissions to the UE 121 from TPs in the coordination cell area 101-105, 107 currently serving the UE 121. Here, the third/fourth interference state may depend on whether the UE 121 is configured for two CSI processes or three or more CSI processes as will be discussed in the embodiments below in more detail.

In this way, the network node 110 may classify the surrounding TPs of the TP of cell 101 serving the UE 121 according to a metric indicating their relevance as interfering TPs. This metric may be based on e.g. received power, such as, e.g. RSRP, at the UE 121 which is reported back to the network node 110. The ranking of the surrounding/neighboring TPs according to the metric may then be used by the network node 110 to determine which TPs that successively should be turned on or off when performing the interference contribution estimations as described in the following actions.

Action 201

In this action, the network node 110 configures two or more TPs to transmit signals on IM resources of CSI processes of the UE according to different interference states. In more detail, this means that the network node 110 configures two or more TPs in the coordination cell area 101-105, 107 not currently serving the UE 121 to transmit signals on interference measurement, e.g. CSI-IM, resources of two or more CSI processes of the UE 121 according to three or more different interference states.

It should be noted that an interference state may here be a transmission configuration of the two or more TPs operative to cause a specific transmission pattern of the signals on the IM resources of a CSI process.

In some embodiments, when the UE 121 is configured for two CSI processes, the network node 110 may first configure the two or more TPs to transmit signals on the IM resources of a first CSI process according to a first interference state, and to transmit signals on the IM resources of a second CSI process according to a second interference state for a first measurement period. Then, the network node may, for a second measurement period, configure the two or more TPs to transmit signals on the IM resources of the first CSI process according to a third interference state, and to transmit signals on the IM resources of the second CSI process according to a fourth interference state.

In this case, the second interference state may correspond to a transmission configuration of the two or more TPs in which a first TP of the two or more TPs has switched transmission state as compared to the transmission configuration of the two or more TPs according to the first interference state. Also, the fourth interference state may correspond to a transmission configuration of the two or more TPs in which a second TP of the two or more TPs has switched transmission state as compared to the transmission configuration according to the third interference state. In some embodiments, the first and second TP may here be a first and second TP selected in an order in accordance with Action 200, i.e. based on which is the strongest interfering TP in the cell coordination area 101-105, 107.

In some embodiments, the network node 110 may configure the TPs according to a reference interference hypothesis/scenario on the IM resources of the first CSI process. This means that the first and third interference states may correspond to different transmission configurations of the two or more TPs according to their most likely transmission states for upcoming one or more Transmission Time Intervals, TTIs. Alternatively, however, the first and third interference states may correspond to the same transmission configuration. The reference interference hypothesis/scenario may be a so-called traffic interference hypothesis/scenario. This traffic interference hypothesis/scenario may be calculated by the network node 110 from the probabilities that the two or more TPs in the coordination area 101-105, 107 will transmit, i.e. the network node 110 may make an assessment of which interference hypothesis/scenario is most likely to occur for upcoming Time Transmission Intervals, TTIs.

One advantage of using the traffic interference hypothesis/scenario as the reference interference hypothesis/scenario is that it represents the best guess that the network node 110 may make regarding the upcoming UE traffic. This therefore represents a best starting point, or baseline, for eventual corrections that the network node 110 may have to make using coarse wideband interference information. A further advantage of using the traffic interference hypothesis/scenario as the reference interference hypothesis/scenario is that the traffic interference hypothesis/scenario is common to all UEs in a cell and transmission of this interference hypothesis/scenario on said interference measurement resources requires no coordination between the UEs in a cell. However, it should be noted that other reference interference hypotheses/scenarios may also be used by the network node 110.

It should be noted that, according to some embodiments, at least one interference state during a measurement period may correspond to a transmission configuration of the two or more TPs according to their most likely transmission states for upcoming one or more TTIs.

In some embodiments, when the UE 121 is configured for at least three CSI processes, the network node 110 may, for a first measurement period, configure the two or more TPs to transmit signals on the IM resources of a first CSI process according to a first interference state, to transmit signals on the IM resources of a second CSI process according to a second interference state, and to transmit signals on the IM resources of a third CSI process according to a third interference state.

In some embodiments, the second interference state may correspond to a transmission configuration of the two or more TPs in which a first TP of the two or more TPs has switched transmission state as compared to the transmission configuration of the two or more TPs according to the first interference state. For example, the network node 110 may transmit a second interference hypothesis/scenario on IM resources of the second CSI process where the most important, or strongest, interfering TP, e.g. TP2, has changed state compared to the traffic interference hypothesis/scenario, i.e. the first interference state, of the first CSI process. This means that the first TP may here be selected as described in Action 200, i.e. the strongest interference TP.

This configuration of the TPs on the IM resources, e.g. CSI-IM, of the UE 121 for TP1 of the serving cell 101 is shown by the two first rows, i.e. CSI-IM 1 for the first CSI process and CSI-IM 2 for the second CSI process, in the table of FIG. 3. Note that in the table of FIG. 3, the notation $Xj$ is a Boolean true or false representation of on/off of the interfering TP j. The notation $\sim Xj$ is used to denote $not(Xj)$ which serves to indicate a transmission state that is different from $X_j$. It should also be noted that it does not matter what state $Xj$ represents, the method works regardless of the interfering TP's state and lends itself well to explanations using the Boolean notation of the traffic hypothesis/scenario.

Also, the third interference state may correspond to a transmission configuration of the two or more TPs in which a second TP of the two or more TPs has switched transmission state as compared to the transmission configuration according to the first interference state. For example, the network node 110 may transmit a third interference hypothesis/scenario on IM resources of the third CSI process where the second most important, or strongest, interfering TP, e.g. TP3, has changed state compared to the traffic interference hypothesis/scenario, i.e. the first interference state, of the first CSI process. This means that the second TP may here be selected as described in Action 200, i.e. the second strongest interfering TP in the cell coordination area 101-105, 107. Furthermore, this is exemplified by the table of FIG. 3, wherein when the UE 121 is capable of measuring three CSI processes, the third CSI process, i.e. CSI-IM 3, may be used by the network node 110 to assess the interference contribution from the second strongest interfering TP, e.g. TP3 in FIG. 3.

FIG. 3 shows a table of a configuration of CSI-IMs for a UE 121 for TP1 of the serving cell 101 that has two interesting interfering TPs, i.e. TP2 and TP3. The CSI-IM 1 may be used for the traffic interference hypothesis/scenario, i.e. the first interference state, and the second and third CSI-IMs, i.e. CSI-IM 2 and CSI-IM 3, may be used to measure the separate interference contributions from the interfering TP2 and TP3, respectively. It may here be noted that in these measurements, the TP1 of the serving cell 101 is muted, since it is the interference contribution by the other TPs on its transmissions to the UE 121 that is of interest.

In some embodiments, more than two interfering TPs may be relevant, whereby the network node 110 may use further measuring periods, i.e. as in the case of having only two CSI processes as mentioned above, in order to estimate the interference contribution from the more than two interfering TPs when the UE 121 is configured for at least three CSI processes. Thus, the network node 110 may, for a second measurement period, further configure three or more TPs to transmit signals on the IM resources of the first CSI process according to a fifth interference state, to transmit signals on the IM resources of the second CSI process according to a sixth interference state, and to transmit signals on the IM resources of the third CSI process according to a seventh interference state.

In some embodiments, the sixth interference state corresponds to a transmission configuration of the three or more TPs in which a third TP of the three or more TPs has switched transmission state as compared to the transmission configuration of the three or more TPs according to the fifth interference state. Also, the seventh interference state corresponds to a transmission configuration of the three or more TPs in which a fourth TP of the three or more TPs has switched transmission state as compared to the transmission configuration according to the fifth interference state. In some embodiments, the first and fifth interference states may correspond to different transmission configurations of the two or more TPs according to their most likely transmission states for upcoming one or more TTIs and/or be the same.

FIG. 4 shows a table of a configuration of CSI-IMs for a UE 121 for TP1 of the serving cell 101 that has four interesting interfering TPs, i.e. TP2-TP5. Note that the TP2-TP5 may, as described in Action 200, be arranged in a decreasing order of signal strength. The resources of the first CSI process, i.e. CSI-IM 1, may be used by the network node 110 for the traffic interference hypothesis as described above for both a first and a second measurement period X and Y, i.e. the first and fifth interference state. These are denoted in FIG. 4 with a reference number 1 and 5. Also, the resources of the second and third CSI process, i.e. CSI-IM 2 and CSI-IM 3, may first be used by the network node 110 to measure the separate interference contributions from the interfering TP2 and TP3, respectively, for the first measuring period, X. These are denoted in FIG. 4 with a reference number 2 and 3.

Then, the resources of the second and third CSI process, i.e. CSI-IM 2 and CSI-IM 3, may be used by the network node 110 to measure the separate interference contributions from the interfering TP4 and TP5, respectively, for the second measuring period, Y. These are denoted in FIG. 4 with a reference number 6 and 7. FIG. 4 further shows hypotheses/scenarios for which the SINR may be determined by the network node 110 using the received CSI reports from the same first and second How these may be determined or calculated by the network node 110 is described more in detail in Action 203 below. Also, the contributions $ICI_x$ and $ICI_y$ represent non-coordinated intra-cluster and inter-cluster interference captured by the measurements for the first and second measurement periods, X and Y, respectively. While these contributions may generally fluctuate during a measurement period, making relative comparisons only between hypotheses/scenarios transmitted during the same measurement periods means that such fluctuations may be neglected.

In the example shown in FIG. 4, the SINRs for any interference hypothesis/scenario which comprises changing the state of the interfering transmission points, TP4 and/or TP5, may not be determined during the first measurement period, X.

However, once the CQI values in the CSI reports of the hypotheses/scenarios for the first measurement period X have converged to stable values, the interference hypotheses/scenarios are changed for the second measurements period Y so that the interference contributions from TP4 and TP5 may be determined. For the second measurement period Y, the traffic interference hypothesis/scenario, i.e. reference number 5, looks the same as in the first measurement period, i.e. reference number 5, the Booleans here $Y_j$ may in fact have changed compared to the previous measurement period $X_j$. However, this does not have any greater effect on the method in general. For simplicity, it is here and in the following assumed they have not changed, so that $Y_j = X_j$.

This means that the third and fourth TP may be selected as described in Action 200, i.e. the third and fourth strongest interfering TPs in the cell coordination area 101-105, 107.

It should also be noted that the signals transmitted on interference measurement resources, e.g. CSI-IM, of the at least first, second and third CSI process may be broadcasted to several UEs in one or more cells 101-105, 107 by the network nodes 110-112.

It should further be noted that in case of having even further interfering TPs and/or CSI processes that are relevant to assess, the network node 110 may configure five or more TPs to transmit signals on the IM resources of the first, second, third and/or further CSI processes according to different further interference states for further measurement periods. This may be performed according to the same manner as described above. In fact, the more interfering TPs that need to be assessed, the more effective the method described in the actions herein becomes.

Action 202

In this action, the network node 110 receives CSI reports based on the transmitted signals. This means that the network node 110 receives, from the UE 121, CSI reports based on the transmitted signals on the IM resources of the two or more CSI processes of the UE 121.

Action 203

In this action, the network node 110 estimates one SINR for each different interference state and at least one further SINR corresponding to at least one interference state that is not part of the different interference states. In more detail, this means that the network node 110 estimates one signal quality value for each of the three or more different interference states of the transmitted signals and at least one further signal quality value corresponding to at least one interference state that is not part of the three or more different interference states of the transmitted signals based on the received CSI reports of the two or more CSI processes.

The signal quality values may be SINR values determined by the network node 110 based on the CQI values received in the CSI reports, that is, the signal quality values are Signal-to-Interference-plus-Noise-Ratios, SINRs, determined by the network node 110 from Channel Quality Indicators, CQIs, received in the CSI reports of the two or more CSI processes.

According to a first example, when the UE 121 is configured for two CSI processes, the network node 110 may estimate SINRs for the first and second CSI process during a first and second measurement period X and Y. This will provide a SINR for the first, second, third and fourth interference state. The network node 110 may also estimate a fifth SINR based on these measured SINRs, e.g. via calculations based on the measured SINRs. This fifth SINR may be calculated in a similar manner as described below for the example shown in FIG. 3, and may correspond to an interference state wherein both the strongest and second strongest TP, i.e. TP 2 and TP 3, are in a transmission state different from their reference transmission states.

According to a second example, as shown in FIG. 3, when the UE 121 is configured for at least three CSI processes, the network node 110 may estimate SINRs for the first, second and third CSI process during a first measurement period X. This will provide a SINR for a first, second, and third interference state.

The network node 110 may also estimate a fourth SINR based on these measured SINRs, e.g. via calculations based on the measured SINRs. This fourth SINR may correspond to an interference state wherein both the strongest and second strongest TP, i.e. TP 2 and TP 3, are in different transmission states compared to their transmission states in the first (reference) interference state, i.e. CSI-IM 4 in FIG. 3.

In the example shown in FIG. 3, where the TP1 only has two interfering TPs, TP2 and TP3, the only unmeasured interference hypothesis/scenario is the combination of (0, ~X2, ~X3), i.e. CSI-IM 4 or the fourth interference state. However, since the interference hypothesis/scenario in general may need to be transmitted during repeated CSI reporting periods during a measurement period, the network node 110 may be unable to quickly switch the interfering TPs to measure this fourth interference state. Instead, the network node 110 may use the previous interference hypotheses/scenarios according to the table in FIG. 3, i.e. CSI-IM 1-3, to determine this interference hypothesis/scenario using the existing measurements.

This may, for example, be performed according to the following:

First, the interference and noise for the three hypotheses/scenarios corresponding to CSI-IM 1-3 may be defined as:

$$N^1 = X_2 I_2 + X_3 I_3 + I_{other},$$

$$N^2 = \tilde{X}_2 I_2 + X_3 I_3 + I_{other}$$

$$N^3 = X_2 I_2 + \tilde{X}_3 I_3 + I_{other}$$

where $I_2$ and $I_3$ may denote the interference power from TP2 and TP3, respectively, and $I_{other}$ corresponds to interference from non-coordinated TPs and noise.

Then, the interference for the unmeasured hypothesis/scenario may be expressed as:

$$N^{wanted} = \tilde{X}_2 I_2 + \tilde{X}_3 I_3 + I_{other} == \tilde{X}_2 I_2 + X_3 I_3 + I_{other} +$$
$$\tilde{X}_2 I_2 + I_{other} - (X_2 I_2 + X_3 I_3 + I_{other}) == N^2 + N^3 - N^1$$

Consequently, when defining the signal strength G, the corresponding SINR expression may be expressed as:

$$SINR^{wanted} = \frac{G}{(\tilde{X}_2 I_2 + X_3 I_3 + I_{other}) + (X_2 I_2 + \tilde{X}_3 I_3 + I_{other}) - (X_2 I_2 + X_3 I_3 + I_{other})} ==$$

$$\frac{G}{\frac{G}{SINR^2} + \frac{G}{SINR^3} - \frac{G}{SINR^1}} = \frac{1}{\frac{1}{SINR^2} + \frac{1}{SINR^3} - \frac{1}{SINR^1}}$$

where $SINR^j$ may be determined or calculated from the CQI reports of the CSI process j the UE 121 transmits to the network node 110 after measurements on CSI-IM j. It should be noted that quantization effects of the CQI may here be neglected.

It should be noted that this estimation assumes that the rank, RI, is the same for all interference hypotheses/scenarios during the first measurement period, and the weights in the filter of the UE 121 for filtering the signals on the interference measurement resources, e.g. CSI-IM, are more or less similar for all measurements. This is a reasonable first-order approximation. The resulting calculated SINR, e.g. $SINR^{wanted}$, is in any case much more accurate than any SINR estimated from wideband interference information. In some embodiments, when transmissions to a UE 121 is interfered by more than two significant interfering TPs, the determination described above may be combined with wideband interference information estimates for the weaker interfering TPs.

According to a third example, the resources of the first, second and third CSI process, i.e. CSI-IM 1, CSI-IM 2 and CSI-IM 3, may be used by the network node 110 to further measure the separate interference contributions from the interfering TP4 and TP5, respectively, for the second measuring period, Y, simultaneously as the traffic interference hypothesis/scenario, i.e. the fifth interference state or CSI-IM 5. This means that, when the UE 121 is configured for at least three CSI processes, the network node 110 may estimate SINRs for the first, second and third CSI process during a first and a second measurement period X and Y. This will provide a SINR for a first, second and third interference state during the first measurement period and for a fifth, sixth and seventh interference state during the second interference state.

Here, the network node 110 may estimate a fourth SINR in the same manner as described above with reference to FIG. 3. Thus, using the measurements from the second measurement period Y, the SINR corresponding to the interference hypothesis/scenario of (0, Y2, Y3, ~Y4, ~Y5), i.e. CSI-IM 8 in FIG. 4, may be calculated or determined in the same manner as described above for the fourth SINR for the first measurement period X.

Thus, the network node 110 may estimate an eighth SINR corresponding to an interference state wherein both the third and fourth strongest TPs, i.e. TP 4 and TP 5, are in transmission states which are changed from the transmission states of the fifth interference state, i.e. CSI-IM 8 in FIG. 4.

According to a fourth example, the network node 110 may estimate the at least one further signal quality value based on the received CSI reports of the two or more CSI processes during one, two or more measurement periods. Here, the at least one further signal quality value may be several signal quality values corresponding to an interference state which may be estimated, i.e. in this case calculated, by the network node 110 based on the measured signal quality values. This is shown in the example of FIG. 5.

FIG. 5 shows an identical table as in FIG. 4, except in that it comprises further configurations of CSI-IMs for a UE 121 for TP1 of the serving cell 101 that has four interesting interfering TPs, i.e. TP2-TP5. For these further configurations, i.e. with reference number 9-10 and onwards in FIG. 5, the network node 110 may use the previous interference hypotheses/scenarios according to the table in FIG. 5 for both the first and second measurements period, X-Y, to calculate or determine this interference hypothesis/scenario using the existing measurements.

This means that the SINR for all other configurations, i.e. with reference number 9-10 and onwards in FIG. 5, may be estimated by the network node 110 by using the measurements of the previous period, i.e. the first measurement period X, combined with the measurements of this period, i.e. the second measurement period Y. It should be noted that by doing so, the reason for measuring on a reference interference hypothesis/scenario becomes clear. It provides the possibility to neutralize the ICI of the measurement period and uniquely identify the contribution from each interfering TP that has switched transmission state compared to the reference interference state.

An illustrative example of how the network node 110 may calculate or determine the SINR of these further configurations is shown below for the interference hypothesis/scenario with reference number 10 in FIG. 5.

The noise and interference of the interference hypothesis/scenario may be calculated or determined as:

$$N^{10} = \tilde{Y}_2 I_2 + \tilde{Y}_3 I_3 + \tilde{Y}_4 I_4 + \tilde{Y}_5 I_5 + ICI_Y ==$$
$$\tilde{Y}_2 I_2 + (Y_2 I_2 + Y_3 I_3 + \tilde{Y}_4 I_4 + Y_5 I_5 + ICI_Y) - Y_2 I_2 ==$$
$$N^6 + \tilde{Y}_2 I_2 - Y_2 I_2 = \{if \ X_2 = Y_2\} == N^6 + N^2 - N^1$$

A more general example for the determination or calculation of the further configurations in FIG. 5 is provided below.

Here, the difference between the traffic interference hypothesis/scenario and the current interference hypothesis/scenario of the further configuration during transmission is denoted by the difference vector (D2, D3, D4, D5); that is, if the current interference hypothesis/scenario is e.g. (X2, ~X3, ~X4, X5), then the difference vector is (0, 1, 1, 0). Using the difference vector notation, the current interference hypothesis/scenario of the further configuration during transmission may be expressed as:

$$N^{wanted} = (Y_2 + (\tilde{Y}_2 - Y_2)D_2)I_2 + (Y_3 + (\tilde{Y}_3 - Y_3)D_3)I_3 +$$
$$(Y_4 + (\tilde{Y}_4 - Y_4)D_4)I_4 ++ (Y_5 + (\tilde{Y}_5 - Y_5)D_5)I_5 + ICI_Y =$$
$$\{if \ X_2 = Y_2, X_3 = Y_3\} == (Y_2 + (\tilde{X}_2 - X_2)D_2)I_2 + (Y_3 + (\tilde{X}_3 - X_3)D_3)$$
$$I_3 + (Y_4 + (\tilde{Y}_4 - Y_4)D_4)I_4 ++ (Y_5 + (\tilde{Y}_5 - Y_5)D_5)I_5 + ICI_Y$$

This current interference hypothesis/scenario may also be formulated in terms of the interference accounted for in the measured previous hypotheses/scenarios, as subtractions of the interference for the traffic interference hypothesis/scenario from those where the state of a specific interfering TP is changed:

$$N^{wanted} = N^5 + (N^2 - N^1)D_2 + (N^3 - N^1)D_3 + (N^6 - N^5)D_4 + (N^7 - N^5)D_5$$

The interference SINR values here all correspond to SINRs of the previous measured hypotheses/scenarios, and the expression may be rewritten in terms of the signal power G and the SINRs as:

$$\frac{G}{SINR^{wanted}} = \frac{G}{SINR^5} + \left(\frac{G}{SINR^2} - \frac{G}{SINR^1}\right)D_2 +$$
$$\left(\frac{G}{SINR^3} - \frac{G}{SINR^1}\right)D_3 ++ \left(\frac{G}{SINR^6} - \frac{G}{SINR^5}\right)D_4 + \left(\frac{G}{SINR^7} - \frac{G}{SINR^5}\right)D_5$$

Finally, since G cancels out if the UE 121 reports the same rank, RI, for all measurements, the SINR for the current interference hypothesis/scenario of the further configuration may be expressed as $$SINR^{wanted} = \frac{1}{\frac{1 - D_4 - D_5}{SINR^5} + \frac{D_2}{SINR^2} + \frac{D_3}{SINR^3} + \frac{-D_2 - D_3}{SINR^1} + \frac{D_4}{SINR^6} + \frac{D_5}{SINR^7}}$$

which may easily be generalized to a general case with N number of interfering TPs and more than two measurement periods. If the UE reports different ranks for different measurements, the different signal power per stream as well as the inter-stream interference may also be accounted for.

The expression may also be extended to the case where the traffic interference hypothesis/scenario has changed between the two measurement periods. Define a difference vector between the traffic hypothesis during the measurement period of measuring the impact of a certain interferer and the traffic hypothesis in the most recent measurement, denoted (L2,L3,L4,L5). L2 is one if X2 differs between measurement period X, where the impact of interference from TP2 is measured, and measurement period Y, which is the most recent measurement. In general, the SINR for transmission may then be expressed as:

$$SINR^{wanted} == \frac{1}{\frac{1 - D_4(-1)^{L_4} - D_5(-1)^{L_5}}{SINR_1^t} + \frac{D_2(-1)^{L_2}}{SINR_2^{t-1}} + \frac{D_3(-1)^{L_3}}{SINR_3^{t-1}} +}$$
$$\frac{-D_2(-1)^{L_2} - D_3(-1)^{L_3}}{SINR_1^{t-1}}$$
$$+ \frac{1}{\frac{D_4(-1)^{L_4}}{SINR_2^t} + \frac{D_5(-1)^{L_5}}{SINR_3^t}}$$

Since it may take time to time-multiplex measurements of a large number of interfering TPs, it could be of interest to prioritize measurements of the strongest interfering TPs. For example, the interference contribution from the two strongest interfering TPs may be estimated through more frequent measurements than interference from weaker interfering TPs.

Action 205

Optionally, in this action, the network node 110 may schedule transmission, that is, the network node 110 may schedule coordinated transmissions to the UE 121 from TPs in the coordination cell area 101-105, 107 and/or selecting transmission configuration settings for TPs in the coordination cell area 101-105, 107 using the estimated signal quality values. This means that the estimated interference contributions, i.e. the estimated signal quality values or SINRs, may be used by the network node 110 for scheduling purposes, such as, e.g. coordinated scheduling, and to select transmission configurations for different transmission patterns, e.g. Modulation and Coding Schemes (MCS), rank (RI), etc.

Action 206

In this action, the network node 110 perform coordinated transmissions, that is, the network node 110 may perform coordinated transmissions to the UE 121 from one or more TPs of the coordination cell area 101-105, 107.

Figure 6:
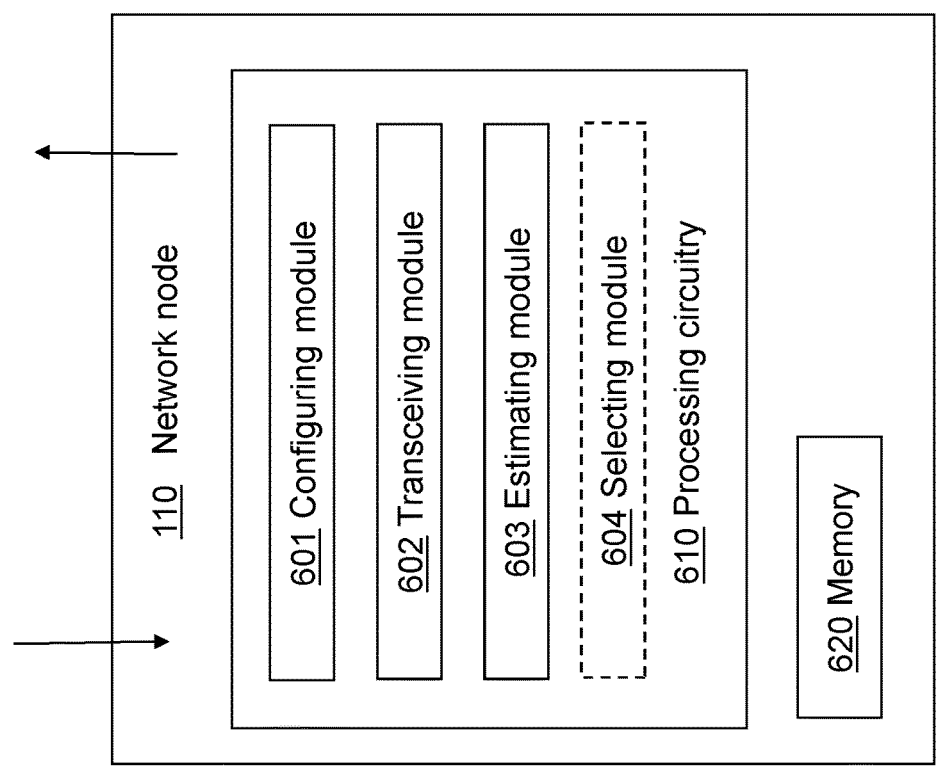
FIG. 6 is a schematic block diagram depicting embodiments of a network node.

To perform the method actions in the network node 110 for enabling transmissions to a UE 121 from TPs in a coordination cell area 101-105, 107 in a radio communications network 100, the network node 110 may comprise the following arrangement depicted in FIG. 6. The network node 110 is configured to be in a wireless communications network, such as, e.g. the radio communications network 100 in FIG. 1.

FIG. 6 shows a schematic block diagram of embodiments of the network node 110. In some embodiments, the network node 110 may comprise a configuring module 601, a transceiving module 602, an estimating module 603, and an selecting module 604. In some embodiments, the network node 110 may comprise a processing circuitry 610, which may also be referred to as processing module, processing unit or processor. The processing circuitry 610 may comprise one or more of the configuring module 601, transceiving module 602, an estimating module 603, and a selecting module 604, and/or perform the function thereof described below.

The network node 110 is configured to, or comprises the configuring module 601 being configured to, configure two or more TPs in the coordination cell area 101-105, 107 not currently serving the UE 121 to transmit signals on IM resources of two or more CSI processes of the UE 121 according to three or more different interference states. Furthermore, the network node 110 is configured to, or comprises the transceiving module 602 being configured to, receive, from the UE 121, CSI reports based on the transmitted signals on the IM resources of the two or more CSI processes of the UE 121. The network node 110 is also configured to, or comprises the estimating module 603 being configured to, estimate one signal quality value for each of the three or more different interference states of the transmitted signals and at least one further signal quality value corresponding to at least one interference state that is not part of the three or more different interference states of the transmitted signals based on the received CSI reports of the two or more CSI processes.

In some embodiments, an interference state is a transmission configuration of the two or more TPs operative to cause a specific transmission pattern of the signals on the IM resources of a CSI process. In some embodiments, the network node 110 may be further configured to, or comprises the transceiving module 602 being configured to, schedule coordinated transmissions to the UE 121 from TPs in the coordination cell area 101-105, 107 and/or selecting transmission configuration settings for TPs in the coordination cell area 101-105, 107 using the estimated signal quality values. Also, the network node 110 or transceiving module 602 may be further configured to perform coordinated transmissions to the UE 121 from one or more TPs of the coordination cell area 101-105, 107.

When the UE 121 is configured for two CSI processes, the network node 110 may be further configured to, or comprises the configuring module 601 being configured to, configure the two or more TPs to transmit signals on the IM resources of a first CSI process according to a first interference state. Here, the network node 110 or transceiving module 602 may be further configured to transmit signals on the IM resources of a second CSI process according to a second interference state for a first measurement period. Further, the network node 110 may be further configured to, or comprises the configuring module 601 being configured to configure the two or more TPs to transmit signals on the IM resources of the first CSI process according to a third interference state, and transmit signals on the IM resources of the second CSI process according to a fourth interference state for a second measurement period. Here, the second interference state may correspond to a transmission configuration of the two or more TPs in which a first TP of the two or more TPs has switched transmission state as compared to the transmission configuration of the two or more TPs according to the first interference state, and the fourth interference state may correspond to a transmission configuration of the two or more TPs in which a second TP of the two or more TPs has switched transmission state as compared to the transmission configuration according to the third interference state. Furthermore, the first and third interference states may correspond to different transmission configurations of the two or more TPs according to their most likely transmission states for upcoming one or more Transmission Time Intervals, TTIs and/or be the same.

When the UE 121 is configured for at least three CSI processes, the network node 110 may be further configured to, or comprises the configuring module 601 being configured to, configure the two or more TPs to transmit signals on the IM resources of a first CSI process according to a first interference state, transmit signals on the IM resources of a second CSI process according to a second interference state, and transmit signals on the IM resources of a third CSI process according to a third interference state for a first measurement period. Here, the second interference state may correspond to a transmission configuration of the two or more TPs in which a first TP of the two or more TPs has switched transmission state as compared to the transmission configuration of the two or more TPs according to the first interference state, and the third interference state may correspond to a transmission configuration of the two or more TPs in which a second TP of the two or more TPs has switched transmission state as compared to the transmission configuration according to the first interference state.

In some embodiments, the network node 110 or the configuring module 601 may be further configured to configure three or more TPs to transmit signals on the IM resources of the first CSI process according to a fifth interference state, transmit signals on the IM resources of the second CSI process according to a sixth interference state, and transmit signals on the IM resources of the third CSI process according to a seventh interference state for a second measurement period. Here, the sixth interference state may correspond to a transmission configuration of the three or more TPs in which a third TP of the three or more TPs has switched transmission state as compared to the transmission configuration of the three or more TPs according to the fifth interference state. Also, the seventh interference state may correspond to a transmission configuration of the three or more TPs in which a fourth TP of the three or more TPs has switched transmission state as compared to the transmission configuration according to the fifth interference state. Furthermore, in some embodiments, the first and fifth interference states may correspond to different transmission configurations of the two or more TPs according to their most likely transmission states for upcoming one or more Transmission Time Intervals, TTIs and/or be the same.

In some embodiments, the network node 110 or configuring module 601 may be further configured to configure five or more TPs to transmit signals on the IM resources of the first, second, third and/or further CSI processes according to different further interference states for further measurement periods. Also, in some embodiments, the network node 110 or estimating module 602 may be further configured to estimate the at least one further signal quality value based on the received CSI reports of the two or more CSI processes during one, two or more measurement periods.

Furthermore, in some embodiments, the network node 110 or selecting module 604 may be further configured to select the two or more TPs in the coordination cell area 101-105, 107 not currently serving the UE 121 based on the strongest interfering TPs to transmissions to the UE 121 from TPs in the coordination cell area 101-105, 107 currently serving the UE 121. In some embodiments, the network node 110 or selecting module 604 may also be further configured to select the first, second, third and/or fourth TP switching transmission state in the second, third/fourth, sixth and seventh interference state, respectively, in an order based on the strongest interfering TP to transmissions to the UE 121 from TPs in the coordination cell area 101-105, 107 currently serving the UE 121.

In some embodiments, at least one interference state during a measurement period corresponds to a transmission configuration of the two or more TPs according to their most likely transmission states for upcoming one or more Transmission Time Intervals, TTIs. Also, in some embodiments, the network node 110 or estimating module 602 may be further configured to determine the signal quality values as Signal-to-Interference-plus-Noise-Ratios, SINRs, from Channel Quality Indicators, CQIs, received in the CSI reports of the two or more CSI processes.

The embodiments for enabling transmissions to a UE 121 from TPs in a coordination cell area 101-105, 107 may be implemented through one or more processors, such as, e.g. the processing circuitry 610 in the network node 110 depicted in FIG. 6, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 610 in the network node 110. The computer program code may e.g. be provided as pure program code in the network node 110 or on a server and downloaded to the network node 110. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the network node 110 may further comprise a memory 620, which may be referred to or comprise one or more memory modules or units. The memory 620 may be arranged to be used to store executable instructions and data, such as, e.g. received CSI reports, estimated signal quality values, etc., to perform the methods described herein when being executed in the network node 110, the processing circuitry 610 and/or modules 601-603. Those skilled in the art will also appreciate that the processing circuitry 610 and the memory 620 described above may refer to a combination of analog and digital circuits, and/or one or more processors configured with software and/or firmware, e.g. stored in the memory 620, that when executed by the one or more processors, such as, the processing circuitry 610 and/or modules 601-603, cause the one or more processors to perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program, comprising instructions which, when executed on at least one processor, e.g. the processing circuitry 610 or modules 601-603, cause the at least one processor to carry out the method for enabling transmissions to a UE 121 from TPs in a coordination cell area 101-105, 107. Also, some embodiments may further comprise a carrier containing said computer program, wherein the carrier is one of an electronic signal, optical signal, radio signal, or computer readable storage medium.

The terminology used in the detailed description of the particular exemplary embodiments illustrated in the accompanying drawings is not intended to be limiting of the described method and the network node 110, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a network node for enabling transmissions to a user equipment (UE) from transmission points (TPs) in a coordination cell area in a radio communications network, the method comprising:
configuring two or more TPs in the coordination cell area not currently serving the UE to transmit signals on interference measurement (IM) resources of two or more Channel State Information (CSI) processes of the UE according to three or more different interference states;
receiving, from the UE, CSI reports based on the transmitted signals on the IM resources of the two or more CSI processes of the UE;
estimating one signal quality value for each of the three or more different interference states of the transmitted signals and at least one further signal quality value corresponding to at least one interference state that is not part of the three or more different interference states of the transmitted signals, based on the received CSI reports of the two or more CSI processes;
one or more of scheduling coordinated transmissions to the UE from TPs in the coordination cell area and selecting transmission configuration settings for TPs in the coordination cell area, using the estimated signal quality values; and
performing coordinated transmissions to the UE from one or more TPs of the coordination cell area.

2. The method according to claim 1, wherein an interference state is a transmission configuration of the two or more TPs operative to cause a specific transmission pattern of the transmitted signals on the IM resources of a CSI process.

3. The method according to claim 1, wherein, when the UE is configured for two CSI processes, the configuring further comprises:
configuring the two or more TPs to transmit signals on the IM resources of a first CSI process according to a first interference state and transmit signals on the IM resources of a second CSI process according to a second interference state, for a first measurement period; and
configuring the two or more TPs to transmit signals on the IM resources of the first CSI process according to a third interference state and transmit signals on the IM resources of the second CSI process according to a fourth interference state, for a second measurement period.

4. The method according to claim 3, wherein the second interference state corresponds to a transmission configuration of the two or more TPs in which a first TP of the two or more TPs has switched transmission state as compared to a transmission configuration of the two or more TPs according to the first interference state, and wherein the fourth interference state corresponds to a transmission configuration of the two or more TPs in which a second TP of the two or more TPs has switched transmission state as compared to a transmission configuration according to the third interference state.

5. The method according to claim 4, wherein the first and third interference states correspond to different transmission configurations of the two or more TPs according to their most likely transmission states for upcoming one or more Transmission Time Intervals (TTIs) and/or are the same.

6. The method according to claim 1, wherein, when the UE is configured for at least three CSI processes, the configuring further comprises:
configuring the two or more TPs to transmit signals on the IM resources of a first CSI process according to a first interference state, transmit signals on the IM resources of a second CSI process according to a second interference state, and transmit signals on the IM resources of a third CSI process according to a third interference state, for a first measurement period.

7. The method according to claim 6, wherein the second interference state corresponds to a transmission configuration of the two or more TPs in which a first TP of the two or more TPs has switched transmission state as compared to a transmission configuration of the two or more TPs according to the first interference state, and wherein the third interference state corresponds to a transmission configuration of the two or more TPs in which a second TP of the two or more TPs has switched transmission state as compared to the transmission configuration according to the first interference state.

8. The method according to claim 6, wherein the configuring further comprises:
configuring three or more TPs to transmit signals on the IM resources of the first CSI process according to a fifth interference state, transmit signals on the IM resources of the second CSI process according to a sixth interference state, and transmit signals on the IM resources of the third CSI process according to a seventh interference state, for a second measurement period.

9. The method according to claim 8, wherein the sixth interference state corresponds to a transmission configuration of the three or more TPs in which a third TP of the three or more TPs has switched transmission state as compared to a transmission configuration of the three or more TPs according to the fifth interference state, and wherein the seventh interference state corresponds to a transmission configuration of the three or more TPs in which a fourth TP of the three or more TPs has switched transmission state as compared to the transmission configuration according to the fifth interference state.

10. The method according to 9, wherein first and fifth interference states correspond to different transmission configurations of the two or more TPs according to their most likely transmission states for upcoming one or more Transmission Time Intervals (TTIs) and/or are the same.

11. The method according to claim 3, wherein the configuring further comprises:
configuring five or more TPs to transmit signals on the IM resources of one or more of the first, second, third and further CSI processes according to different further interference states for further measurement periods.

12. A network node configured to enable transmissions to a user equipment (UE) from transmission points (TPs) in a coordination cell area in a radio communications network, comprising:
processing circuitry configured to:
configure two or more TPs in the coordination cell area not currently serving the UE to transmit signals on interference measurement (IM) resources of two or more Channel State Information (CSI) processes of the UE according to three or more different interference states;
receive, from the UE, CSI reports based on the transmitted signals on the IM resources of the two or more CSI processes of the UE;
estimate one signal quality value for each of the three or more different interference states of the transmitted signals and at least one further signal quality value corresponding to at least one interference state that is not part of the three or more different interference states of the transmitted signals, based on the received CSI reports of the two or more CSI processes;
one or more of schedule coordinated transmissions to the UE from TPs in the coordination cell area and select transmission configuration settings for TPs in the coordination cell area, using the estimated signal quality values; and
perform coordinated transmission to the UE from one or more TPs of the coordination cell area.

13. The network node according to claim 12, wherein an interference state is a transmission configuration of the two or more TPs operative to cause a specific transmission pattern of the transmitted signals on the IM resources of a CSI process.

14. The network node according to claim 12, wherein the processing circuitry is configured to:
when the UE is configured for two CSI processes, configure the two or more TPs to transmit signals on the IM resources of a first CSI process according to a first interference state and transmit signals on the IM resources of a second CSI process according to a second interference state, for a first measurement period; and
configure the two or more TPs to transmit signals on the IM resources of the first CSI process according to a third interference state and transmit signals on the IM resources of the second CSI process according to a fourth interference state, for a second measurement period.

15. The network node according to claim 14, wherein the second interference state corresponds to a transmission configuration of the two or more TPs in which a first TP of the two or more TPs has switched transmission state as compared to a transmission configuration of the two or more TPs according to the first interference state, and the fourth interference state corresponds to a transmission configuration of the two or more TPs in which a second TP of the two or more TPs has switched transmission state as compared to a transmission configuration according to the third interference state.

16. The network node according to claim 15, wherein the first and third interference states correspond to different transmission configurations of the two or more TPs according to their most likely transmission states for upcoming one or more Transmission Time Intervals (TTIs) and/or are the same.

17. The network node according to claim 12, wherein the processing circuitry is configured to, when the UE is configured for at least three CSI processes, configure the two or more TPs to transmit signals on the IM resources of a first CSI process according to a first interference state, transmit signals on the IM resources of a second CSI process according to a second interference state, and transmit signals on the IM resources of a third CSI process according to a third interference state, for a first measurement period.

18. The network node according to claim 17, wherein the second interference state corresponds to a transmission configuration of the two or more TPs in which a first TP of the two or more TPs has switched transmission state as compared to a transmission configuration of the two or more TPs according to the first interference state, and wherein the third interference state corresponds to a transmission configuration of the two or more TPs in which a second TP of the two or more TPs has switched transmission state as compared to a transmission configuration according to the first interference state.

* * * * *